(12) United States Patent
Mohammad et al.

(10) Patent No.: US 8,634,134 B2
(45) Date of Patent: Jan. 21, 2014

(54) MICROSCOPE SLIDE SEPARATION DEVICES AND METHODS

(75) Inventors: Amin A. Mohammad, Belton, TX (US); Nita Searcy, Temple, TX (US); Alvin Michael Spiekerman, Temple, TX (US)

(73) Assignee: Scott & White Healthcare, Temple, TX (US)

( * ) Notice: Subject to any disclaimer, the term of this patent is extended or adjusted under 35 U.S.C. 154(b) by 462 days.

(21) Appl. No.: 13/090,226

(22) Filed: Apr. 19, 2011

(65) Prior Publication Data

US 2012/0262783 A1 Oct. 18, 2012

Related U.S. Application Data

(63) Continuation-in-part of application No. 13/089,171, filed on Apr. 18, 2011, now abandoned.

(51) Int. Cl.
   *G02B 21/26* (2006.01)
(52) U.S. Cl.
   USPC .......................................... 359/391; 359/396
(58) Field of Classification Search
   USPC .................................... 359/391–398; 356/244
   See application file for complete search history.

(56) References Cited

U.S. PATENT DOCUMENTS

| | | | | |
|---|---|---|---|---|
| 4,447,140 A | * | 5/1984 | Campbell et al. | 359/396 |
| 4,501,495 A | * | 2/1985 | Faulkner et al. | 356/244 |
| 4,995,221 A | | 2/1991 | Stemmer, Jr. | |
| 5,682,992 A | | 11/1997 | Hunt et al. | |
| 5,784,193 A | * | 7/1998 | Ferguson | 359/398 |
| 5,812,312 A | * | 9/1998 | Lorincz | 359/397 |
| 6,052,224 A | * | 4/2000 | Richardson | 359/398 |
| 6,118,582 A | * | 9/2000 | Del Buono | 359/398 |
| 6,305,543 B1 | | 10/2001 | Lafond et al. | |
| 6,431,357 B1 | | 8/2002 | Su | |
| 6,612,771 B1 | | 9/2003 | Su | |
| 6,982,828 B2 | * | 1/2006 | Knittel | 359/396 |
| D624,768 S | | 10/2010 | Clark et al. | |
| 7,952,798 B2 | * | 5/2011 | Ljungmann et al. | 359/391 |
| 2003/0034603 A1 | | 2/2003 | Vijuk | |
| 2005/0205449 A1 | | 9/2005 | Frankeny | |
| 2010/0110541 A1 | * | 5/2010 | Angros | 359/397 |
| 2010/0326862 A1 | * | 12/2010 | Webb et al. | 206/456 |
| 2012/0075695 A1 | * | 3/2012 | DeBlasis et al. | 359/391 |

* cited by examiner

*Primary Examiner* — Frank Font
(74) *Attorney, Agent, or Firm* — Fulbright & Jaworski, LLP

(57) ABSTRACT

A microscope slide separation device and method of storing microscope slides are disclosed. In specific embodiments, the microscope slide separation device can be placed a folded position that forms a cavity between at least first and second members configured to receive a microscope slide to which both a sample and a slip cover have been coupled. In particular embodiments, the first member may have at least one side configured not to stick to cover slip mounting media.

20 Claims, 5 Drawing Sheets

MICROSCOPE SLIDE SEPARATION DEVICES AND METHODS

CROSS-REFERENCE(S) TO RELATED APPLICATION(S)

This is a continuation-in-part of application U.S. Ser. No. 13/089,171, filed Apr. 18, 2011, now abandoned the entire contents of which are specifically incorporated by reference.

BACKGROUND INFORMATION

1. Field of the Invention

The present invention relates generally to devices and methods for separating microscope slides that are stored together.

2. Description of Related Art

Existing devices and methods used for the handling of microscope slides may compromise the integrity of the slides, including the biological samples and preparation of the slides. Under common existing environmental conditions, the slides can be stored so that adjacent slides adhere to one another, mandating additional operations to effect separation. Such operations are laborious and may damage the native material.

SUMMARY

Exemplary embodiments of the present disclosure can allow the physical separation of microscope slides (and the material attached to them) from one another, thereby preventing adjacent slides from adhering to each other. Certain of the present microscope slide separation devices can include any suitable number of foldable members (beyond one) that can be bent and secured to create one or multiple cavities into which microscope slides (and any attached material) can be placed. A given device, for example, may be folded to have multiple cavities (e.g., 2, 3, 4, 5, 6, 7, 8, 9, 10, 11, 12, 13, 14, 15, 16, 17, 18, 19, 20 or more) into which the slides corresponding to a single subject (e.g., a patient) can be placed and subsequently stored. Additionally, the slides can be locally removed and re-inserted at the discretion of laboratory staff. Such mechanical handling of the slides can also provide a physical storage foundation for associated orchestrating software and identification protocol.

In one respect, some embodiments of the present microscope slide separation devices comprise a first member; and a second member foldably coupled to the first member; wherein the first member has a length and a width that is less than the length, the length is less than or equal to seventy-five millimeters, and the first member has at least one side configured not to stick to cover slip mounting media.

In another respect, some embodiments of the present microscope slide separation devices comprise a first member; a second member foldably coupled to the first member; and a tab foldably coupled to one of the first member and the second member, the tab comprising an adhesive, the tab being configured to secure the first member and the second member in a folded position that forms a cavity between the first and second members configured to receive a microscope slide to which both a sample and a slip cover have been coupled. The first member has a length and a width that is less than the length, and the length is less than or equal to seventy-five millimeters. Further embodiments include more members foldably coupled to one of the first and second members.

In another respect, some embodiments of the present microscope slide separation devices comprise a first member; a second member foldably coupled to the first member; and a tab foldably coupled to one of the first member and the second member, the tab comprising an adhesive, the tab being configured to secure the first member and the second member in a folded position that forms a cavity between the first and second members configured to receive a microscope slide to which both a sample and a slip cover have been coupled. The first member has at least one side configured not to stick to cover slip mounting media. Further embodiments include more members foldably coupled to one of the first and second members.

In still another respect, the disclosure includes kits that include one or more of the present microscope slide separation devices with or without one or more microscope slides. The slide or slides may each have a length that is equal to or greater than the length of one of the members of the slide separation device.

In one respect, some embodiments of the present methods of storing microscope slides comprise folding a microscope slide separation device comprising a first member foldably coupled to a second member so that the first and second members are closer to each other than they were prior to the folding; securing the first member to the second member, thereby forming a cavity configured to receive a microscope slide to which both a sample and a slip cover have been coupled; and inserting into the cavity a microscope slide to which both a sample and a slip cover have been coupled. Further embodiments include more members foldably coupled to one of the first and second members, and the insertion of one slide into a respective cavity formed by the members when the device is in a folded position.

The term "coupled" is defined as connected, although not necessarily directly, and not necessarily mechanically. The terms "a" and "an" are defined as one or more unless this disclosure explicitly requires otherwise. The terms "substantially," "approximately," and "about" are defined as largely but not necessarily wholly what is specified (and include wholly what is specified) as understood by a person of ordinary skill in the art. In any embodiment of the present disclosure, the terms "substantially," "approximately," and "about" may be substituted with "within [a percentage] of" what is specified, where the percentage includes 1, 5, 10, and 15 percent. The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a device or method that "comprises," "has," "contains," or "includes" one or more elements possesses those one or more elements, but is not limited to possessing only those one or more elements or steps. Likewise, an element of a device or method that "comprises," "has," "contains," or "includes" one or more features possesses those one or more features, but is not limited to possessing only those one or more features. Furthermore, a structure that is configured in a certain way must be configured in at least that way, but also may be configured in a way or ways that are not specified. Metric units may be derived from the English units provided by applying a conversion and rounding to the nearest millimeter.

Any embodiment of any of the present devices and methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

BRIEF DESCRIPTION OF THE FIGURES

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF EXEMPLARY EMBODIMENTS

Figure 1:
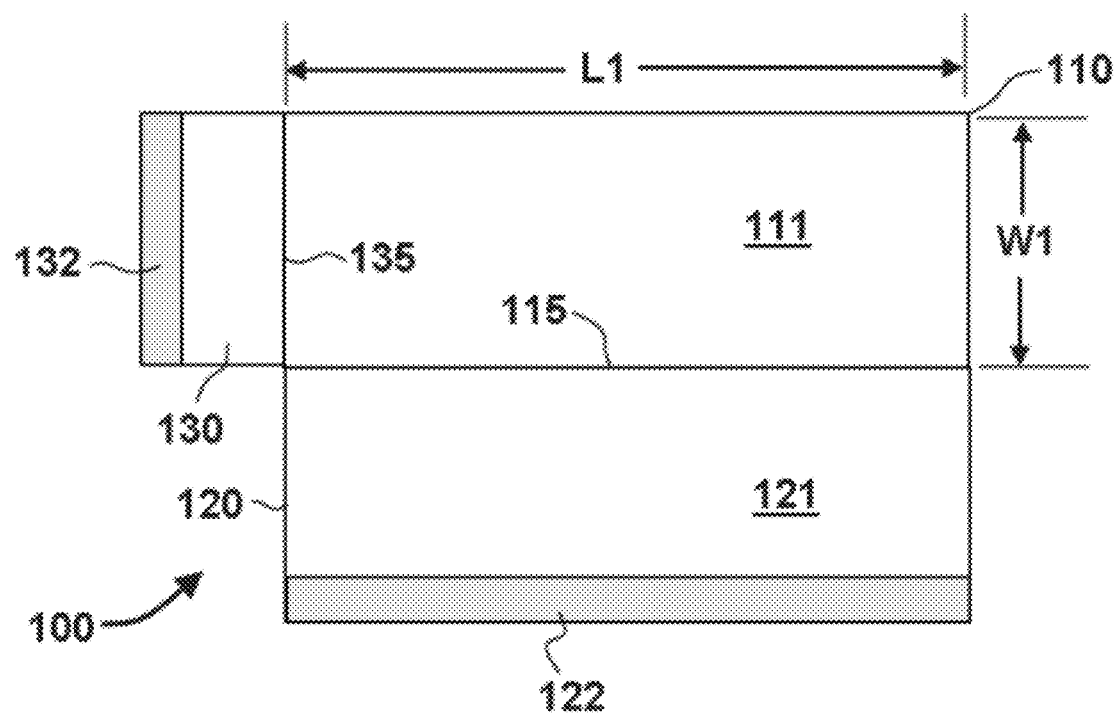
FIG. 1 is a orthogonal view of one embodiment of one of the present microscope slide separation devices in a first unfolded position.
Figure 2:
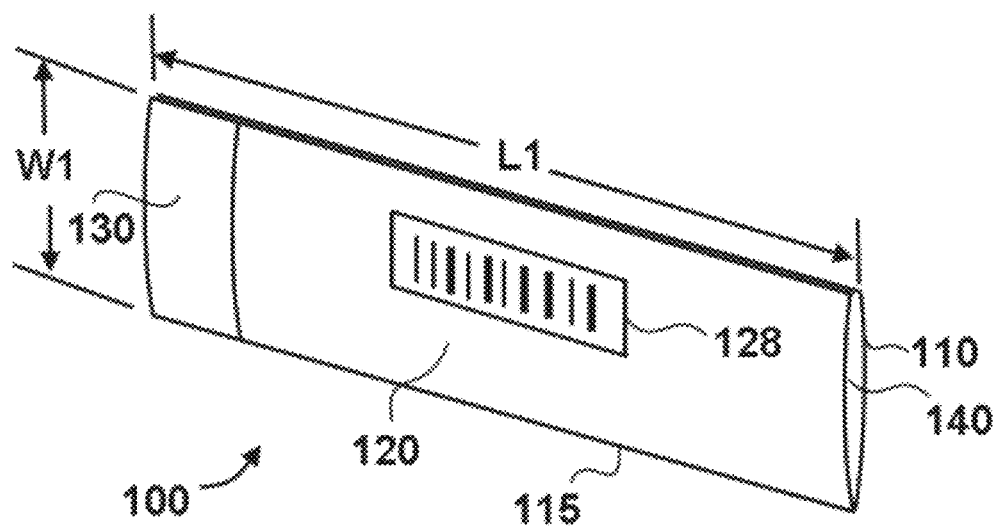
FIG. 2 is a perspective view of the embodiment of FIG. 1 in a second folded position.

Referring now to the exemplary embodiment shown in FIGS. 1-2, microscope slide separation device 100 comprises first member 110, second member 120, and tab 130. This embodiment is illustrated in a first unfolded position in FIG. 1, and a second folded position in FIG. 2. In the illustrated embodiment, first member 110, second member 120, and tab 130 are formed from a unitary piece of paper. In specific embodiments, the paper may comprise vellum paper or paper that includes silicone (such as siliconized paper available from Griff Paper and Film (Fallsington, Pa.), weight: 70#, grade: BL S2S Release Separator). Examples of vellum paper that are suitable include those that are clear, colored, and translucent, and include ASTROPARCHE brand paper and ASTROBIRGHTS brand paper (available from Wasau Paper, Dallas, Tex.).

In this embodiment, second member 120 is foldably coupled to first member 110 along a boundary 115, and tab 130 is foldably coupled to first member 110 along a boundary 135. Boundaries 115 and 135 may be conditioned in any suitable manner known to those of ordinary skill in the art (e.g., by scoring) to make folding along them easier and/or more feasible. In other embodiments, tab 130 may be foldably coupled to second member 120 rather than first member 110. In the illustrated embodiment, second member 120 comprises an adhesive 122, which is configured to adhere or secure second member 120 to first member 110 when microscope separation device 100 has been folded along boundary 115. In the embodiment shown, tab 130 comprises an adhesive 132 such that tab 130 is configured to secure first member 110 and second member 120 in the folded position shown in FIG. 2. In certain embodiments, adhesive 122 and 132 may be covered by a removable backing tape (not shown) to prevent adhesive 122 and 132 from adhering to surfaces unintentionally.

During use, a user may fold microscope slide separation device 100 along boundary 115 so that the first and second members 110, 120 are closer to each other than they were prior to the folding. The user may secure second member 120 to first member 110 by removing any backing tape from adhesive 122 and pressing first member 110 and second member 120 together in the area where adhesive 122 contacts first member 110. The user may also remove any backing tape from adhesive 132 and fold tab 130 along boundary 135. Tab 130 can be secured to second member 120 by pressing tab 130 to second member 120 in the area where adhesive 132 contacts second member 120.

In this manner, microscope slide separation device 100 is folded to form a cavity 140 between first member 110 and second member 120. Cavity 140 is configured to receive a microscope slide to which both a sample and a slip cover have been coupled. Cavity 140 comprises a length L1 and a width W1 that are equivalent to the length L1 and width W1 of first member 110. In this embodiment, width W1 is less than length L1. Length L1 is also less than the length of a microscope slide that is intended to be inserted into cavity 140. Example lengths for L1 include 60 to 74 millimeters, including 60, 61, 62, 63, 64, 65, 66, 67, 68, 69, 70, 71, 72, 73, and 74 mm, and may be at least 60 mm (and, in some embodiments, greater than any of these up to 73 mm) but also less than or equal to any of these (down to the lower bound). In some embodiments, the length of L1 is 85 to 90 percent of the length of the slide that device 100 is configured to hold. Example widths for W1 include 25.5 to 27 mm, including 25.5, 25.6, 25.7, 25.8, 25.9, 26.0, 26.1, 26.2, 26.3, 26.4, 26.5, 26.6, 26.7, 26.8, 26.9, and 27.0 mm, and may be at least 25.5 mm (and, in some embodiments, greater than any of these up to 26.9 mm) but also less than or equal to any of these (down to the lower bound).

Figure 3:
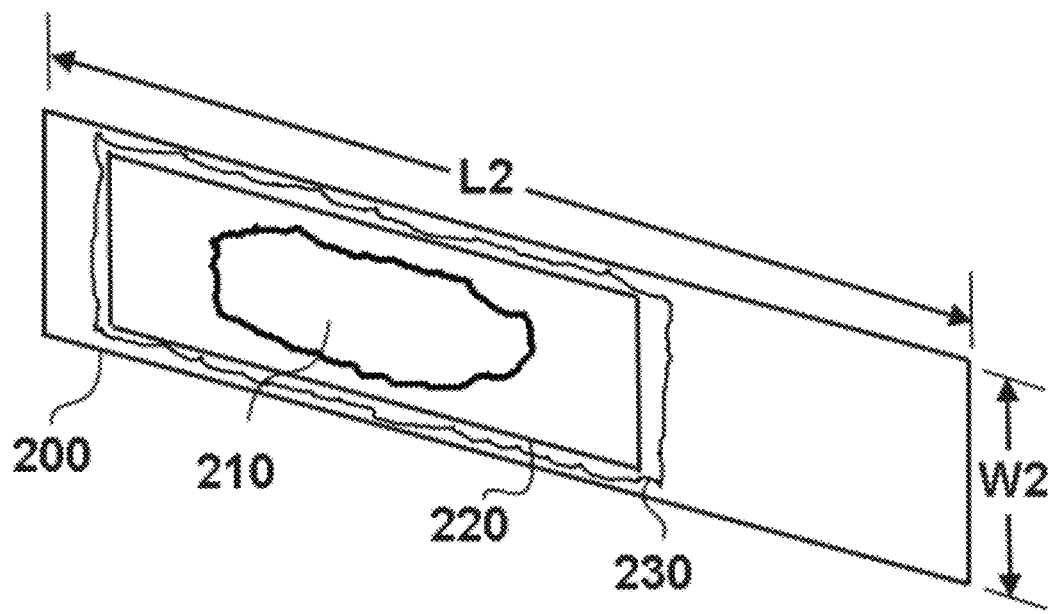
FIG. 3 is a perspective view of a microscope slide configured for use with the embodiment of FIG. 1.

Referring now to FIG. 3, microscope slide 200 is illustrated with a length L2 and width W2. In certain embodiments, length L2 is approximately 75 millimeters. As shown in FIG. 3, cover slip mounting media 230 (e.g., epoxy) is used to couple a sample 210 and a slip cover 220 to microscope slide 200.

Figure 4:
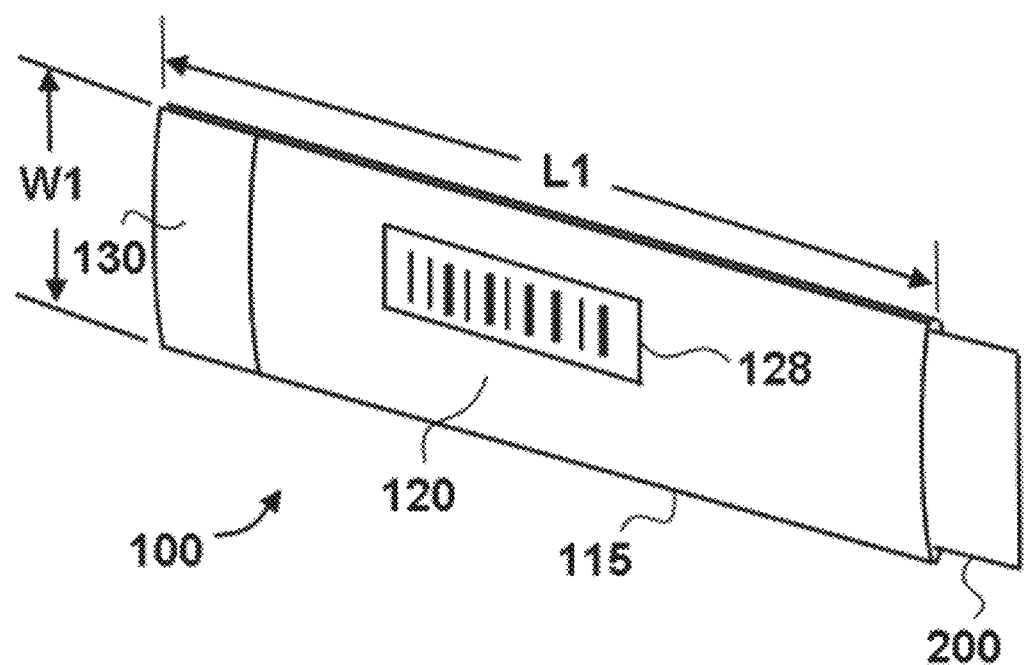
FIG. 4 is a perspective view of the embodiment of FIG. 1 in a second folded position with the microscope slide of FIG. 3 inserted.

Referring now to FIG. 4, microscope slide 200 has been inserted into cavity 140 of microscope slide 200. Sample 210 and slip cover 220 are coupled to microscope slide 200 with cover slip mounting media 230, but are not visible in FIG. 4 because they are covered by first and second members 110 and 120. First and second members 110 and 120 can protect sample 210, slip cover 220, and mounting media 230 from contact with the outside environment, including other microscope slides (and anything coupled to them). First and second members 110 and 120 can be formed from material that is not configured to stick to cover slip mounting media 230 (any media—other than the biological sample itself—that has been used in the art to cause a cover slip to stay coupled to the slide). In more particular embodiments, one or more of the present members may be formed from material that is not configured to stick to cover slip mounting media that is miscible with xylene. In still other particular embodiments, one or more of the present members may be formed from material that is not configured to stick to cover slip mounting media that is miscible with a xylene substitute, such as toluene, butyl acetate, or acrylic. Specific examples of such mounting media include POLY-MOUNT brand mounting medium and CITRAMOUNT brand mounting medium (from Polysciences, Inc., Warrington, Pa.).

In certain embodiments, first and second members 110 and 120 may comprise vellum paper (such as those identified above). In particular embodiments, first and second members 110 and 120 may comprise paper that includes silicone.

With microscope slide separation device 100 shown in the folded position in FIGS. 2 and 4, an identifying marker 128 is visible. Indicia may be placed on identifying marker 128 to identify microscope slide separation device 100 so that a user can readily determine characteristics of microscope slide 200 and sample 210, including for example, the subject from which the sample was taken, the sample material, the time obtained, and the method of preparation, etc. In certain embodiments, identifying marker 128 may be configured as a bar code that can be electronically scanned to identify microscope slide 200 and sample 210. In other embodiments, identifying marker 128 may comprise a label affixed to microscope slide separation device 100 on which printing can be affixed (e.g., through laser printing) or on which indicia can be marked/written.

Figure 5:
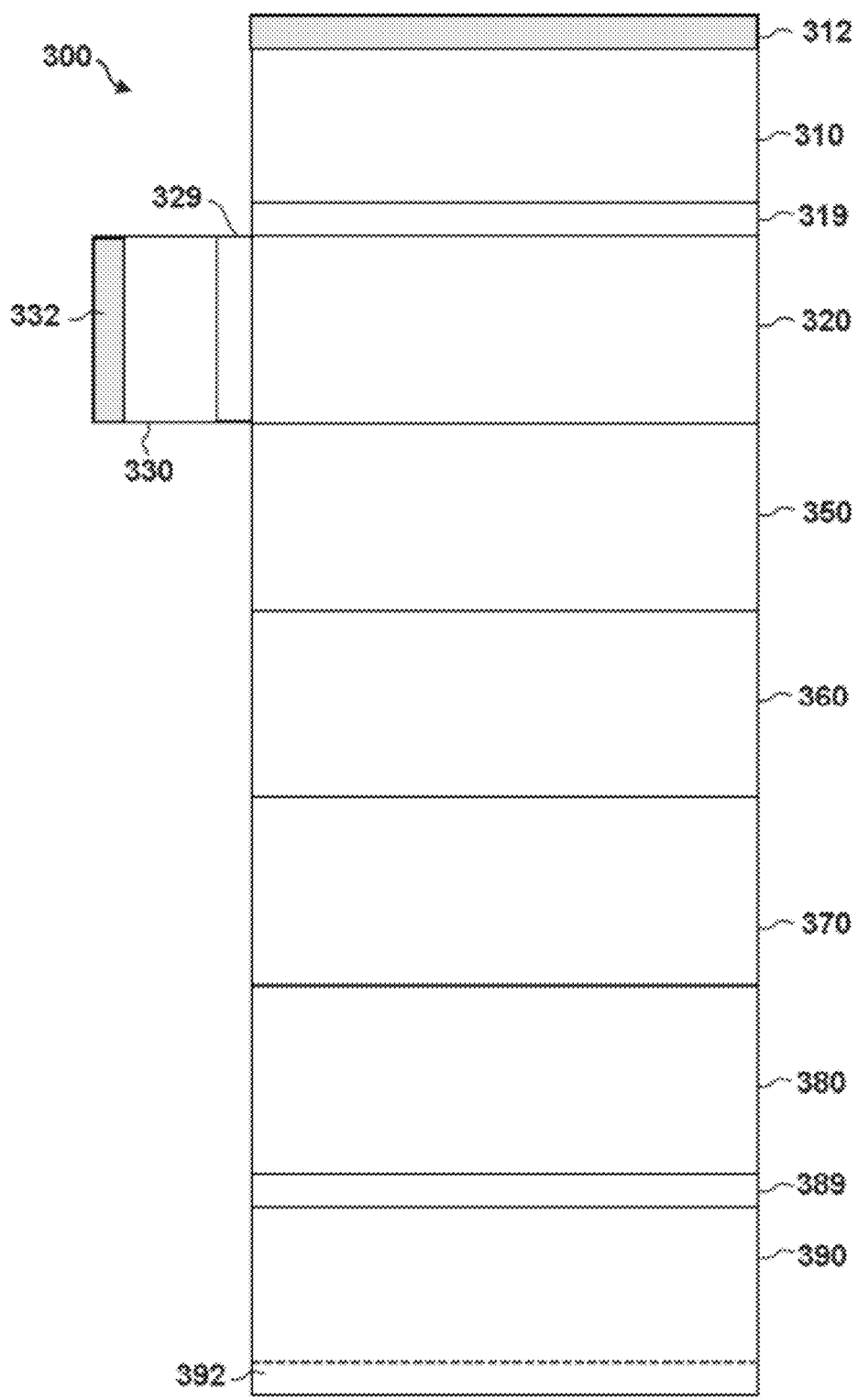
FIG. 5 is a orthogonal view of one embodiment of one of the present microscope slide separation devices in a first unfolded position.
Figure 6:
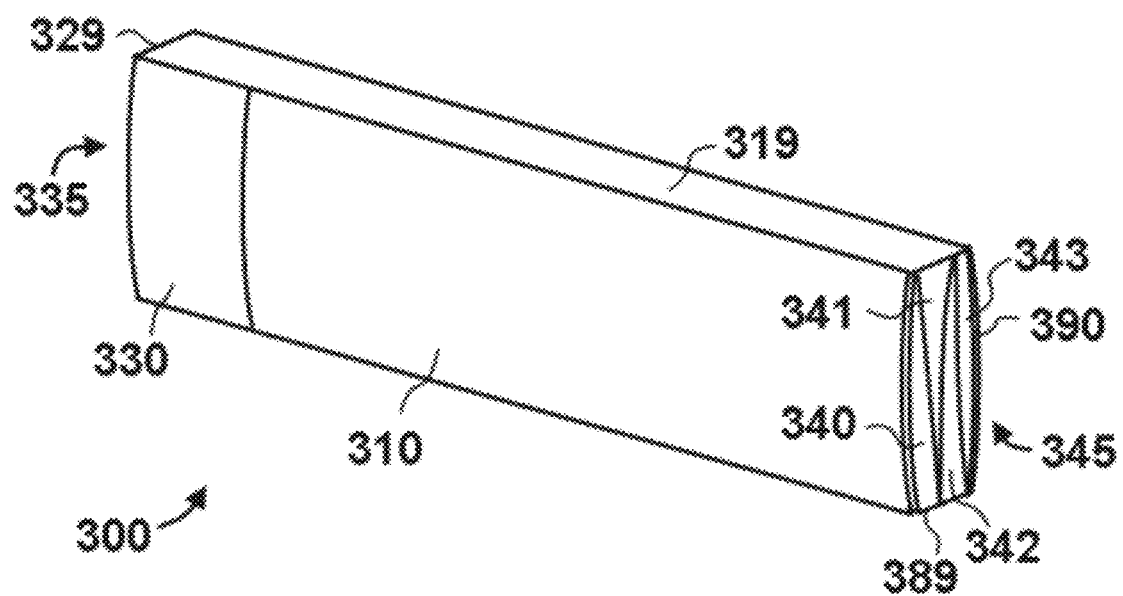
FIG. 6 is a perspective view of the embodiment of FIG. 5 in a second folded position.

In certain embodiments, one of the present microscope slide separation devices may comprise multiple cavities configured to respectively receive multiple microscope slides (e.g., one slide in each cavity). In particular embodiments, the microscope slide separation device may include a plurality of members foldably coupled so that the microscope slides are separated by the members when the microscope slides are inserted into the cavities. Referring now to FIGS. 5-6, a microscope slide device 300 is similar to previously-described microscope slide device 100. However, microscope slide device 300 comprises additional members that create multiple cavities when microscope slide device 300 is placed in the folded position shown in FIG. 6.

As shown in FIG. 5, microscope slide device 300 is illustrated in a first unfolded position. In this position, the individual members are readily visible. Microscope slide device 300 comprises first member 310, second member 320, third member 350, fourth member 360, fifth member 370, sixth member 380, and seventh member 390 that are foldably coupled. Microscope slide device 300 also comprises a spacer member 319 that foldably couples first member 310 and second member 320. Microscope slide device 300 further comprises a spacer member 389 that foldably couples sixth member 380 and seventh member 390.

Microscope slide separation device 300 also comprises a tab 330 foldably coupled to second member 320 via a spacer member 329. In the embodiment shown, tab 330 comprises an adhesive 332 so that tab 330 can be secured to first member 310 when microscope slide device 300 is in the second folded position shown in FIG. 6. In addition, first member 310 comprises an adhesive 312 that allows first member 310 to be coupled to sixth member 380 when microscope slide device 300 is in the folded position shown in FIG. 6. In this embodiment, seventh member 390 also comprises an adhesive 392 (on the side of member 390 that is not visible in FIG. 5) that allows seventh member 390 to be secured to second member 320 when microscope slide separation device 300 is in the folded position shown in FIG. 6.

As shown in FIG. 6, first member 310, second member 320, third member 350, fourth member 360, fifth member 370, sixth member 380, and seventh member 390 may be folded to form cavities 340, 341, 342 and 343 in an open end 345 of microscope slide separation device 300. Members 310, 320, 350, 360, 370, 380 and 390 are not labeled in FIG. 6 for purposes of clarity.

Spacer member 329 extends across a closed end 335 of microscope slide separation device 300 that is opposite of open end 345. Spacer members 319 and 389 extend across the top and bottom, respectively, of microscope slide separation device 300 and allow cavities 340-343 to have ample space to each receive a microscope slide (and any material attached to it). Microscope slides are not shown inserted in cavities 340-343 for purposes of clarity. It is understood that a microscope slide can be inserted into each of cavities 340-343 in a manner similar to that shown in FIG. 3 of the previous embodiment.

The length of microscope slide separation device 300 (as measured between closed end 335 and open end 345) is equivalent to length L1 of microscope slide separation device 100 in the previous embodiment and less than the length of microscope slides that can be inserted into cavities 340-343. Slides inserted into cavities 340-343 can therefore extend from open end 345 of microscope slide separation device 300.

Microscope slide separation device 300 (and members 310, 320, 350, 360, 370, 380, and 390) may also be formed from material that is not configured to stick to cover slip mounting media 230. In certain embodiments, one, some, or each of the members of device 300 may comprise vellum paper (such as those identified above). In particular embodiments, one, some, or each of the members of device 300 may comprise paper that includes silicone.

It should be understood that the present devices and methods are not intended to be limited to the particular forms disclosed. Rather, they are to cover all modifications, equivalents, and alternatives falling within the scope of the claims. For example, other exemplary embodiments (not shown) may combine features and attributes of microscope slide separation devices 100 and 300. For example, other embodiments may comprise an identifying marker as shown on microscope slide separation device 100 with seven (or more) members shown in microscope slide separation device 300. Other embodiments may also comprise spacer members (as shown in microscope slide separation device 300) between the members that form cavities with an identifying marker as shown on microscope slide separation device 100. As yet another example, some embodiments of the present devices include at least two members foldably coupled together, and the device can be folded into a configuration in which two adjacent members among the at least two members are oriented to form a space between them configured to receive a microscope slide (and any attached material and slip cover), without the use of a tab. Such devices may be stored in drawers in which separators (one of which may be the end of a drawer) are placed and between which the device may be positioned to keep it in a folded position. Embodiments of such devices may have any desired number of members that can be folded (e.g., in a zig-zag pattern) to create any desired number of space, each of which may be oriented to be open to the top, or open, end of the drawer; and such a device may be positioned between two separators (or a drawer end and a separator) spaced apart from each other at a suitable distance. Such spaces may, if the members are flat, shaped liked triangles, and a tab or tabs may not be used to keep the device in a folded position.

The claims are not to be interpreted as including means-plus- or step-plus-function limitations, unless such a limitation is explicitly recited in a given claim using the phrase(s) "means for" or "step for," respectively.

The invention claimed is:

1. A microscope slide separation device comprising:
a first member; and
a second member foldably coupled to the first member;
wherein the first member has a length and a width that is less than the length, the length is less than or equal to seventy-five millimeters, and the first member has at least one side configured not to stick to cover slip mounting media.

2. The microscope slide separation device of claim 1, wherein the first member comprises vellum paper.

3. The microscope slide separation device of claim 1, wherein the first member comprises paper that includes silicone.

4. The microscope slide separation device of claim 1, further comprising an identifying marker configured to identify the microscope slide separation device.

5. The microscope slide separation device of claim 1, wherein one of the first member and the second member comprises an adhesive.

6. The microscope slide separation device of claim 1, wherein the first member and the second member comprise a unitary piece.

7. The microscope slide separation device of claim 1, wherein the first member and the second member are foldably coupled along a boundary extending along the length of the first member.

8. The microscope slide separation device of claim 1, further comprising a plurality of additional members foldably coupled to the second member, wherein the plurality of additional members form a plurality of spaces configured to receive a plurality of microscope slides when the microscope slide separation device is placed in a folded position.

9. A microscope slide separation device comprising:
a first member;
a second member foldably coupled to the first member; and
a tab foldably coupled to one of the first member and the second member, the tab comprising an adhesive, the tab being configured to secure the first member and the second member in a folded position that forms a cavity between the first and second members configured to receive a microscope slide to which both a sample and a slip cover have been coupled;
wherein the first member has a length and a width that is less than the length, and the length is less than or equal to seventy-five millimeters.

10. The microscope slide separation device of claim 9, wherein the first member comprises vellum paper.

11. The microscope slide separation device of claim 9, wherein the first member comprises paper that includes silicone.

12. The microscope slide separation device of claim 9, further comprising an identifying marker configured to identify the microscope slide separation device.

13. The microscope slide separation device of claim 9, wherein one of the first member and the second member comprises an adhesive.

14. The microscope slide separation device of claim 9, wherein first member, the second member, and the tab comprise a unitary piece.

15. The microscope slide separation device of claim 9, wherein the first member and the second member are foldably coupled along a boundary extending along the length of the first member.

16. The microscope slide separation device of claim 9, wherein the tab has a width and is foldably coupled to one of the first member and the second member along a boundary extending along the width of the tab.

17. The microscope slide separation device of claim 9, further comprising a plurality of additional members foldably coupled to the second member, wherein the plurality of additional members form a plurality of cavities configured to receive a plurality of microscope slides when the microscope slide separation device is placed in a folded position.

18. The microscope slide separation device of claim 17, further comprising:
a first spacer member between the tab and one of the first member and the second member:
a second spacer member between the first member and the second member; and
a third spacer member between a first additional member and a second additional member of the plurality of additional members.

19. A microscope slide separation device comprising:
a first member;
a second member foldably coupled to the first member; and
a tab foldably coupled to one of the first member and the second member, the tab comprising an adhesive, the tab being configured to secure the first member and the second member in a folded position that forms a cavity between the first and second members configured to receive a microscope slide to which both a sample and a slip cover have been coupled;
wherein the first member has at least one side configured not to stick to cover slip mounting media.

20. The microscope slide separation device of claim 19, wherein the first member comprises vellum paper or silicone.

* * * * *